W. F. MANGELS.
MECHANICAL TOBOGGAN SLIDE.
APPLICATION FILED OCT. 14, 1910.
997,071.
Patented July 4, 1911.
3 SHEETS—SHEET 1.
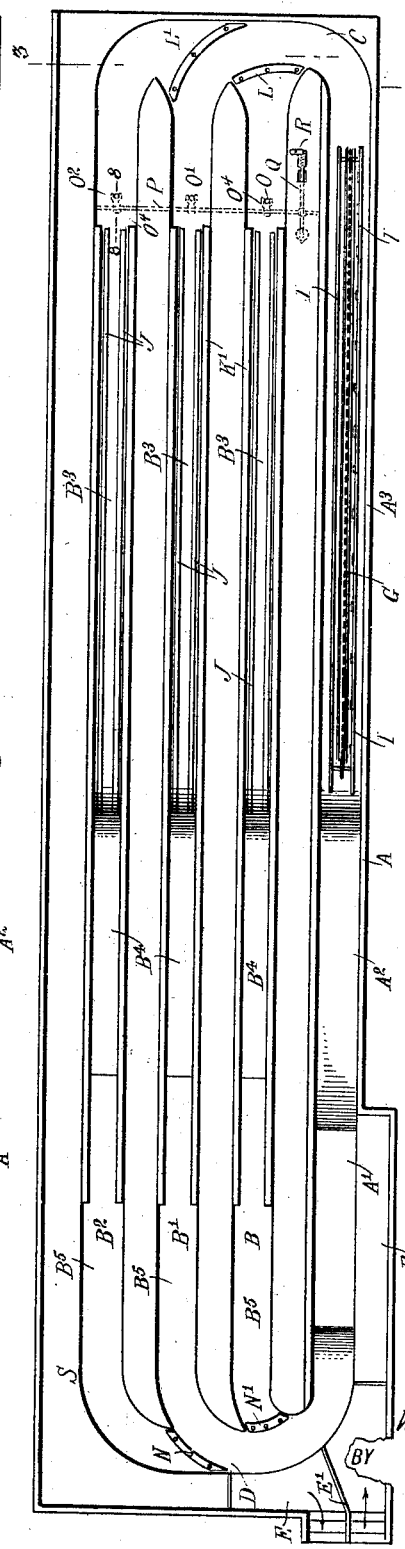
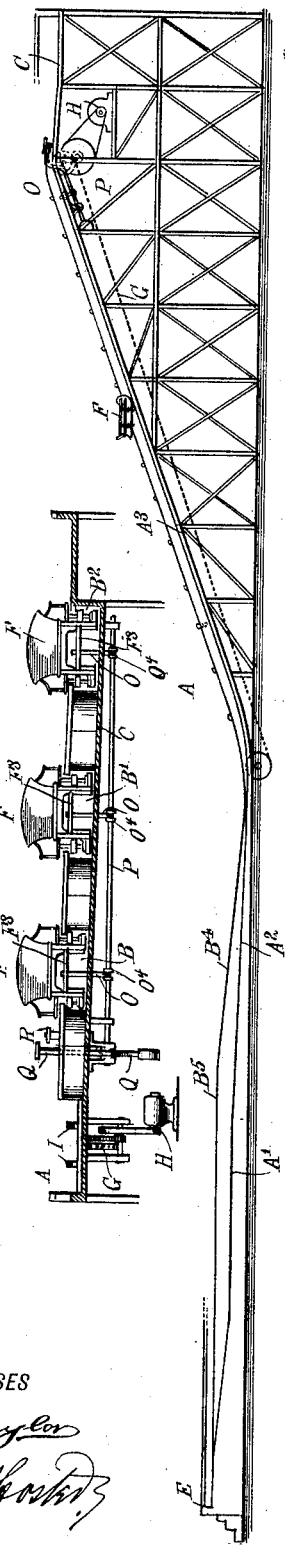
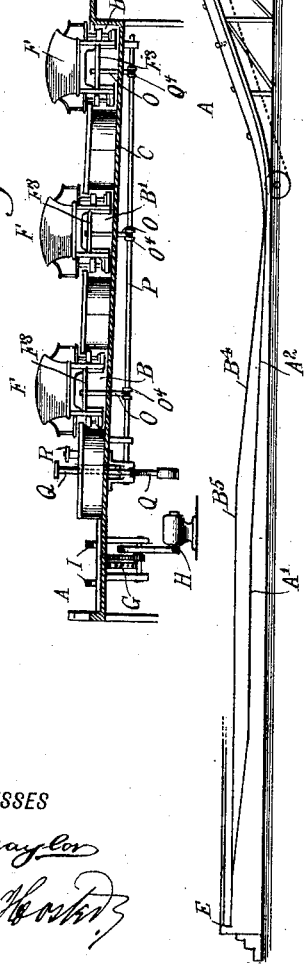
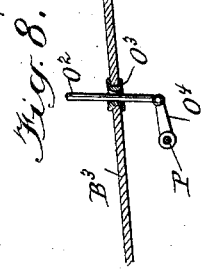
WITNESSES
INVENTOR
William F. Mangels
BY
ATTORNEYS

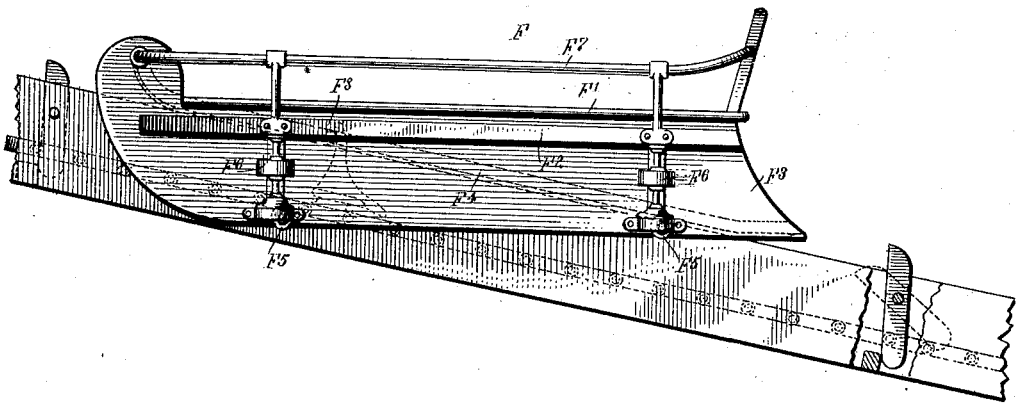
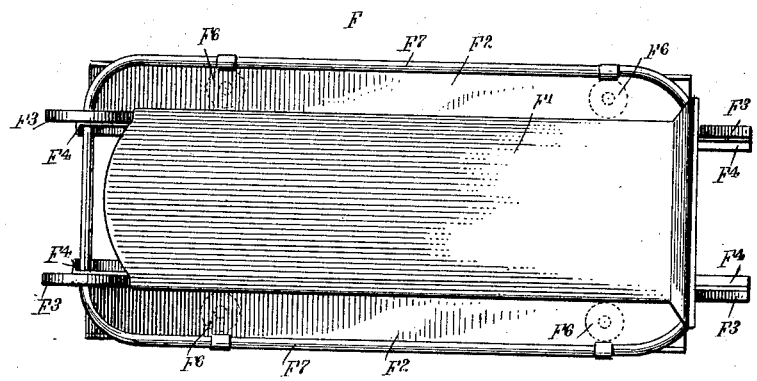

W. F. MANGELS.
MECHANICAL TOBOGGAN SLIDE.
APPLICATION FILED OCT. 14, 1910.

997,071.

Patented July 4, 1911.

3 SHEETS—SHEET 3.

WITNESSES

INVENTOR
William F. Mangels
BY
ATTORNEYS

UNITED STATES PATENT OFFICE.

WILLIAM F. MANGELS, OF NEW YORK, N. Y.

MECHANICAL TOBOGGAN-SLIDE.

997,071. Specification of Letters Patent. Patented July 4, 1911.

Application filed October 14, 1910. Serial No. 587,017.

*To all whom it may concern:*

Be it known that I, WILLIAM F. MANGELS, a citizen of the United States, and a resident of the city of New York, Coney Island, borough of Brooklyn, in the county of Kings and State of New York, have invented a new and Improved Mechanical Toboggan-Slide, of which the following is a full, clear, and exact description.

The invention relates to amusement apparatus, such as are used in pleasure resorts, parks, exhibition grounds and other places, and its object is to provide a new and improved mechanical toboggan slide arranged to afford an exhilarating ride, and to provide means for racing a number of toboggans or sleds starting simultaneously.

For the purpose mentioned, use is made of a toboggan or a sled having both runners and wheels, the wheels being lower than the runners, and a continuous track having an outgoing course, a down or return course, and connecting courses at the terminals of the said outgoing and down courses, the outgoing course having elevating means for drawing up the toboggan and the down course having track rails for runners to run on while the wheels are adapted to travel on the connecting courses.

A practical embodiment of the invention is represented in the accompanying drawings forming a part of this specification, in which similar characters of reference indicate corresponding parts in all the views.

Figure 6:
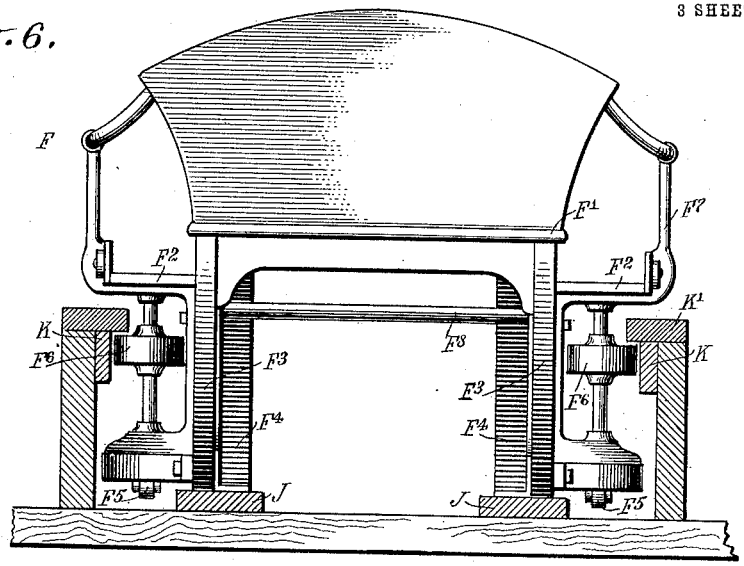
Figure 7:
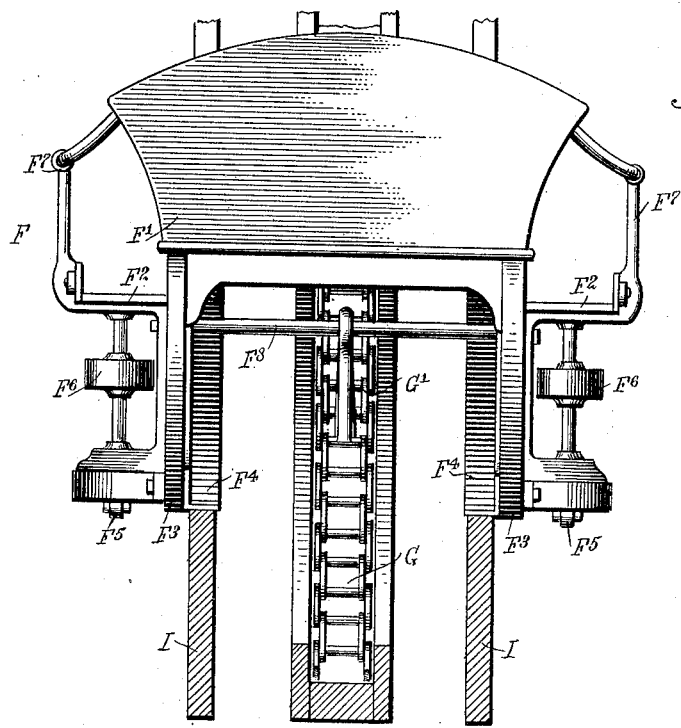

Figure 1 is a side elevation of the mechanical toboggan slide with a toboggan or a sled in position going up the outgoing course; Fig. 2 is a plan view of the same, the toboggan being omitted; Fig. 3 is a cross section of the same on the line 3—3 of Fig. 2; Fig. 4 is an enlarged side elevation of the toboggan on the uptrack of the outgoing course, part of the uptrack being shown in section; Fig. 5 is a plan view of the toboggan; Fig. 6 is an enlarged cross section of the down course with a toboggan in position thereon; Fig. 7 is a like view of the uptrack of the outgoing course with a toboggan in position thereon; and Fig. 8 is an enlarged sectional side elevation of the starting device for a plurality of toboggans, the section being on the line 8—8 of Fig. 2.

The mechanical toboggan slide, as illustrated in Fig. 2, is provided with an outgoing course A, a plurality of return or down courses B, B' and B², an upper connecting course C for connecting the upper end of the outgoing course A with the upper ends of the down courses B, B', B², and a lower connecting or a station course D connecting the terminals of the down courses B, B', B² with the beginning end of the outgoing course A, at the same time passing a station platform E extending along a portion of the outgoing course A, and having a railing or a partition E' to separate the outgoing and home-coming passengers.

One or a number of toboggans F are adapted to travel over the courses in the manner hereinafter more fully described, each toboggan being preferably of the construction illustrated in Figs. 4, 5, 6 and 7, that is, each toboggan is provided with a body F', foot boards F², a set of horizontal runners F³, a set of inclined runners F⁴, a set of wheels F⁵ extending below the runners F³, a set of guide wheels F⁶, a railing F⁷ and a cross bar F⁸.

The outgoing track A is provided with a horizontal or a station portion A', terminating in a downwardly-inclined portion A² leading to the lower end of an uptrack A³, provided with an elevating means in the form of an endless carrier chain G, adapted to be driven by suitable mechanism from a motor H, as indicated in Fig. 1, the said endless chain having arms G' adapted to engage the cross bar F⁸ of a toboggan to draw the same up the uptrack A³, as indicated in Figs. 1 and 7. The uptrack A³ is also provided with track rails I on opposite sides of the elevating means G, and on the said rails I is adapted to travel the set of inclined runners F⁴, so as to hold the body F' of the toboggan F in horizontal position while traveling up the uptrack A³ of the outgoing course A. The portions A' and A² are without track rails, and the toboggan F while passing along the said portions travels with its wheels F⁵ on the bottoms of the said portions A', A², thus insuring an easy running of the toboggan to the beginning of the uptrack A³, at which point an arm G' takes hold of the cross bar F⁸ of a toboggan and carries the same up on the uptrack A³ with the runners F⁴ traveling on the rails I.

Each of the down-courses B, B', B² is provided with a down portion B³, terminating at its lower end in a slightly upwardly-inclined portion B⁴, which leads to a horizontal or home stretch portion B⁵ terminating in a connecting course D. Each course B, B', B² is provided with track rails J for the runners F³ to slide on and also the rear terminals of the inclined runners F⁴, as will be readily understood by reference to Fig. 6, and the said down courses are also provided with side guard rails K for the guide wheels F⁶ to travel on, so as to prevent sidewise swaying of the toboggan during its travel on the down course. A guard rail K' extends over the side guard rail K and over the guide wheels F⁶, so as to prevent the toboggan from accidental upward movement during its travel on the down course B, B' or B². As indicated in Fig. 2, the track and guard rails J, K and K' extend from near the upper ends of the down portions B³, down the same and over the inclined portion B⁴ and a distance along the horizontal portion B⁵, after which the toboggan travels with its wheels F⁵ on the remaining part of the horizontal portion B⁵ and over the return or connecting course D back to the platform portion A' of the outgoing track A.

The upper connecting course C is inclined downwardly from the top terminal of the uptrack A³ to the entrance ends of the down courses B, B', B², so that a toboggan after leaving the elevating means G at the upper end of the uptrack A³ travels on its wheels F⁵ along the connecting course C, to be guided by an attendant to the entrance ends of any one of the down courses B, B', B².

During slack hours, only one down course is preferably used, and in this case use is made of switches L, L' located at the connecting course C and closing the entrances to the down courses B and B², so that a toboggan traveling along the connecting course C is guided into the entrance end of the middle down course B', and switches N, N' arranged at the lower connecting course D close the terminals of the down courses B, B² to form a single continuous track for the toboggan F to travel on.

When it is desired to run a number of toboggans at the same time down the several down courses B, B', B², then the switches L, L', N, N' are removed and use is made of stopping pins O, O', O², mounted to slide up and down in bearings O³ arranged in the bottoms of the courses B, B' and B² (see Fig. 8), and the said stopping pins are pivotally connected with arms O⁴, secured on a transversely-extending shaft P, provided with a weighted lever Q adapted to be locked in a non-active position by a catch R, as indicated in Fig. 2. Normally the weighted lever Q holds the stopping pins O, O', O² in a raised position so that they project into the upper ends of the courses B, B', B², and when the toboggans are guided by an attendant into the entrance ends of the several courses B, B', B² they come to a stop at the raised and transversely-alined stopping pins O, O', O², owing to the latter engaging the cross bars F⁸ of the several toboggans F. Now when the several toboggans are in position on the upper ends of the courses B, B', B² then the operator swings the lever Q downward and thus causes the pins O, O', O² to move downward into releasing position, whereby the pins move out of engagement with the cross bars F⁸ and the toboggans now start simultaneously on their down run in the several courses B, B', B². The momentum acquired by each of the toboggans varies from that of the others according to the weight of the passengers on the toboggans, and consequently toboggans travel at different speeds with the assumption that one will arrive ahead of the others, in other words, the toboggans are racing down the courses B, B', B². When the pins O, O' and O² are not used for holding the toboggans for racing purposes, then the lever Q is locked in the depressed position by the catch R.

Braking devices S may be arranged at the junction of the courses B, B', B² with the connecting course D, to bring the toboggans to a stop, but ordinarily the length of the portions B⁴, B⁵ is such that the toboggans come to a stop about at the time when they reach the connecting course D. The attendants in charge push the toboggan along the course D, after the passengers have disembarked at the portion A', for receiving a new complement of passengers, after which the toboggan is pushed until it passes around to the downward inclined portion A², along which the toboggan travels until it reaches the elevating means G, which draws the toboggan up to the connecting course C, as previously explained.

From the foregoing it will be seen that an exhilarating ride is provided for the passengers making use of the toboggans and, if desired, a number of toboggans may be started simultaneously in a race on the down courses B, B' and B².

Having thus described my invention, I claim as new and desire to secure by Letters Patent:

1. A mechanical toboggan, comprising an outgoing course having mechanical elevating means, a down course, connecting courses at the upper and lower ends of the said outgoing and down courses, and a combination car sled having wheels and runners and capable of being drawn up the uptrack to travel along the connecting courses on its wheels and to slide down the down course on its runners.

2. A mechanical toboggan slide having a continuous track, comprising an outgoing course having mechanical elevating means, a plurality of down-courses, a top-connecting course connecting the upper end of the outgoing course with the upper or entrance ends of the down-courses, a bottom-connecting course connecting the lower ends of the down-courses with the lower end of the outgoing course, and switches in the said upper connecting course to connect the outgoing course with one of the down courses and close the entrances to the other down-courses.

3. A mechanical toboggan slide, comprising an outgoing course having mechanical elevating means, a downcourse having track rails at the bottom and guard rails at the sides, connecting courses connecting the outgoing course with the down-course, and a car sled having runners and wheels, of which the wheels extend below the runners and the runners are adapted to slide on the rails of the down-course, and the said wheels are adapted to travel on the connecting courses and are out of alinement with the track rails, which latter hold the wheels out of contact with the bottom of the down-course during the downward movement of the car.

4. A mechanical toboggan slide, comprising an outgoing course having mechanical elevating means, a down-course having track rails at the bottom and guard rails at the sides, connecting courses connecting the outgoing course with the down-course, and a car sled having two sets of runners, of which one set is inclined to the other and one is in action when the car sled is drawn up the outgoing course, and the other is in action when the car sled slides down the down-course.

5. A mechanical toboggan slide, comprising an outgoing course having mechanical elevating means, a down-course having track rails at the bottom and guard rails at the sides, connecting courses connecting the outgoing course with the down-course, and a car sled having two sets of runners, of which one set is inclined to the other and one is in action when the car sled is drawn up the outgoing course, and the other is in action when the car sled slides down the down-course, the said car sled having wheels adapted to travel on the connecting courses and out of action during the travel of the car sled on the outgoing and down-courses.

6. A mechanical toboggan slide, comprising an outgoing course having mechanical elevating means, a down-course connected at its terminals with the said outgoing course, and a sled adapted to be drawn up the outgoing course by the said elevating means and having two sets of runners, of which one set is inclined relative to the other, the one set being in action during the upward travel of the sled on the outgoing course, and the other set of runners being in action on the downward travel of the sled on the down-course.

7. A mechanical toboggan slide, comprising a sled having two sets of runners arranged one alongside the other and of which one set is inclined relative to the other set, an outgoing course having mechanical means for drawing the sled up, the sled traveling with the inclined runners on the outgoing course while the other set is dormant, and a down-course on which travels the other set of runners while the inclined set of runners is dormant.

8. A mechanical toboggan slide provided with a sled having a set of horizontal runners, and a set of runners inclined to the horizontal set, the inclined runners extending downward and rearward to the rear end of the horizontal runners.

9. A mechanical toboggan slide provided with a sled having a set of horizontal runners, and a set of runners inclined to the horizontal set, the rear terminals of the inclined runners being flush with the rear ends of the horizontal runners.

10. A mechanical toboggan slide provided with a sled having two sets of runners, of which one is inclined to the other, and wheels extending below the lowermost set of runners.

11. A mechanical toboggan slide having a continuous track, and a car sled having wheels and two sets of runners, of which one set is inclined relative to the other set, the said wheels being adapted to travel on one portion of the track, the one set of runners being adapted to travel on another portion of the track and the other set of runners being adapted to travel on still another portion of the track.

12. A mechanical toboggan slide, comprising a continuous track, having an outgoing course provided with a horizontal portion, a downwardly inclined portion and an upwardly inclined portion having mechanical elevating means, a plurality of return or down courses each having a downwardly inclined portion, a slightly upwardly-inclined portion, and terminating in a horizontal portion, an upper connecting course inclined downwardly from the upper end of the outgoing course to the upper or entrance ends of the down courses, and a lower connecting course connecting the horizontal terminals of the down courses with the lower or horizontal end of the outgoing course.

In testimony whereof I have signed my name to this specification in the presence of two subscribing witnesses.

WILLIAM F. MANGELS.

Witnesses:
THEO. G. HOSTER,
PHILIP D. ROLLHAUS.